US009138970B2

(12) United States Patent
Sato et al.

(10) Patent No.: US 9,138,970 B2
(45) Date of Patent: Sep. 22, 2015

(54) THERMALLY SHRINKABLE LAMINATED FILM

(75) Inventors: Eiji Sato, Ichihara (JP); Masayuki Ohishi, Ichihara (JP); Hitoshi Nakazawa, Ichihara (JP)

(73) Assignee: DENKI KAGAKU KOGYO KABUSHIKI KAISHA, Tokyo (JP)

(*) Notice: Subject to any disclaimer, the term of this patent is extended or adjusted under 35 U.S.C. 154(b) by 621 days.

(21) Appl. No.: 13/498,765

(22) PCT Filed: Sep. 28, 2010

(86) PCT No.: PCT/JP2010/066840
§ 371 (c)(1),
(2), (4) Date: Mar. 28, 2012

(87) PCT Pub. No.: WO2011/040408
PCT Pub. Date: Apr. 7, 2011

(65) Prior Publication Data
US 2012/0183795 A1      Jul. 19, 2012

(30) Foreign Application Priority Data

Sep. 29, 2009  (JP) .................................. 2009-223891

(51) Int. Cl.
| | |
|---|---|
| B32B 27/08 | (2006.01) |
| B32B 27/30 | (2006.01) |
| B32B 27/36 | (2006.01) |
| C08L 53/02 | (2006.01) |
| C08L 25/04 | (2006.01) |
| C08L 25/06 | (2006.01) |
| C08L 25/08 | (2006.01) |
| C08F 36/06 | (2006.01) |
| C08F 236/06 | (2006.01) |
| C08F 236/10 | (2006.01) |

(52) U.S. Cl.
CPC ................. *B32B 27/36* (2013.01); *B32B 27/08* (2013.01); *B32B 27/302* (2013.01); *B32B 2250/03* (2013.01); *B32B 2250/24* (2013.01); *B32B 2250/40* (2013.01); *B32B 2270/00* (2013.01); *B32B 2274/00* (2013.01); *B32B 2307/30* (2013.01); *B32B 2307/514* (2013.01); *B32B 2307/516* (2013.01); *B32B 2307/736* (2013.01); *B32B 2325/00* (2013.01); *B32B 2355/00* (2013.01); *B32B 2367/00* (2013.01); *B32B 2519/00* (2013.01); *C08F 36/06* (2013.01); *C08F 236/06* (2013.01); *C08F 236/10* (2013.01); *C08L 25/04* (2013.01); *C08L 25/06* (2013.01); *C08L 25/08* (2013.01); *C08L 53/02* (2013.01); *C08L 2201/12* (2013.01); *C08L 2203/16* (2013.01); *C08L 2205/025* (2013.01); *Y10T 428/1328* (2015.01); *Y10T 428/31786* (2015.04); *Y10T 428/31797* (2015.04); *Y10T 428/31931* (2015.04)

(58) Field of Classification Search
None
See application file for complete search history.

(56) References Cited

U.S. PATENT DOCUMENTS

| | | | | | |
|---|---|---|---|---|---|
| 4,208,356 | A | * | 6/1980 | Fukawa et al. | 525/89 |
| 4,386,125 | A | * | 5/1983 | Shiraki et al. | 428/35.1 |
| 5,089,558 | A | * | 2/1992 | Hall et al. | 525/89 |
| 5,175,213 | A | * | 12/1992 | Suetsugu et al. | 525/89 |
| 5,510,423 | A | * | 4/1996 | Van Dijk et al. | 525/316 |
| 5,545,690 | A | * | 8/1996 | Trepka et al. | 525/98 |
| 5,554,397 | A | * | 9/1996 | Tanaka et al. | 426/36 |
| 6,031,053 | A | * | 2/2000 | Knoll et al. | 525/314 |
| 6,140,433 | A | * | 10/2000 | Zhang et al. | 526/173 |
| 6,197,889 | B1 | * | 3/2001 | Knoll et al. | 525/314 |
| 6,235,847 | B1 | * | 5/2001 | Hoshi et al. | 525/314 |
| 6,835,778 | B2 | * | 12/2004 | Swisher et al. | 525/93 |
| 6,849,692 | B2 | * | 2/2005 | Kim et al. | 525/89 |
| 7,371,805 | B2 | * | 5/2008 | Sasagawa et al. | 526/346 |
| 7,470,747 | B2 | * | 12/2008 | Kurokawa et al. | 525/89 |
| 7,893,156 | B2 | * | 2/2011 | Hoshi et al. | 525/71 |
| 7,951,461 | B2 | * | 5/2011 | ReFraschini et al. | 428/500 |
| 8,258,236 | B2 | * | 9/2012 | Sawasato et al. | 525/89 |
| 2006/0233984 | A1 | * | 10/2006 | Suzuki et al. | 428/34.9 |

(Continued)

FOREIGN PATENT DOCUMENTS

| | | |
|---|---|---|
| JP | 58 225146 | 12/1983 |
| JP | 58-225146 | * 12/1983 |

(Continued)

OTHER PUBLICATIONS

International Search Report issued on Nov. 22, 2010 in PCT/JP10/066840 filed on Sep. 28, 2010.

(Continued)

*Primary Examiner* — Vivian Chen
(74) *Attorney, Agent, or Firm* — Oblon, McClelland, Maier & Neustadt, L.L.P.

(57) ABSTRACT

Disclosed is a thermally shrinkable laminated film which is produced by laminating an intermediate layer comprising a block copolymer resin composition containing a specific block copolymer directly between a front layer and a back layer each comprising a polyester resin, and which has good interlayer adhesion strength. Specifically disclosed is a thermally shrinkable laminated film which is produced by stretching a three-layered laminated sheet along at least one axis so that the interlayer adhesion strength becomes 0.6 N/15 mm or more, wherein the three-layered laminated sheet has an intermediate layer and a front layer and a back layer, the intermediate layer comprises a resin composition comprising two types of block copolymers each having a specific structure and a specific composition at a predetermined mass ratio, and each of the front layer and the back layer comprises a polyester resin.

10 Claims, No Drawings

(56) References Cited

U.S. PATENT DOCUMENTS

| | | | |
|---|---|---|---|
| 2008/0026170 A1* | 1/2008 | Yamada et al. | 428/34.9 |
| 2008/0051510 A1* | 2/2008 | Toney et al. | 525/89 |
| 2008/0057236 A1* | 3/2008 | Yamada et al. | 428/34.9 |
| 2008/0090036 A1* | 4/2008 | Hiruma et al. | 428/34.9 |
| 2009/0130351 A1* | 5/2009 | Hoshi et al. | 428/35.1 |
| 2009/0280341 A1* | 11/2009 | Maruichi et al. | 428/483 |
| 2010/0022711 A1* | 1/2010 | Sawasato et al. | 525/89 |
| 2010/0105838 A1* | 4/2010 | Toya et al. | 525/93 |
| 2011/0152436 A1* | 6/2011 | Chan et al. | 524/505 |
| 2013/0331519 A1* | 12/2013 | Sawasato et al. | 525/99 |

FOREIGN PATENT DOCUMENTS

| | | | |
|---|---|---|---|
| JP | 02-222440 | * | 9/1990 |
| JP | 10 244635 | | 9/1998 |
| JP | 2000 6321 | | 1/2000 |
| JP | 2000-006321 | * | 1/2000 |
| JP | 2004 018800 | | 1/2004 |
| JP | 2004 170715 | | 6/2004 |
| JP | 2004 196978 | | 7/2004 |
| JP | 2005 131824 | | 5/2005 |
| JP | 2005-131824 | * | 5/2005 |
| JP | 2006-089593 | * | 4/2006 |
| JP | 2006 323340 | | 11/2006 |
| JP | 2007 038586 | | 2/2007 |
| JP | 2007-038586 | * | 2/2007 |
| JP | 2009 185105 | | 8/2009 |
| WO | 2007 032328 | | 3/2007 |
| WO | 2009 063988 | | 5/2009 |

OTHER PUBLICATIONS

Extended European Search Report issued on Jul. 7, 2014 in the corresponding European Application No. 10820523.8.

* cited by examiner

THERMALLY SHRINKABLE LAMINATED FILM

TECHNICAL FIELD

The present invention relates to a thermally shrinkable laminated film in which a layer consisting of a vinyl aromatic hydrocarbon block copolymer resin composition and polyester layers are laminated.

BACKGROUND ART

Thermally shrinkable films made of polystyrene resins have been widely used in labels for PET bottles. Additionally, laminated films with front and back layers of polyester resins and an intermediate layer of a polystyrene resin and laminated films with adhesion layers in between these layers have been proposed.

Examples of this type of art include those described in the below-indicated patent documents. However, for laminated films with adhesive layers in between, a step of forming the adhesive layers is needed, and thus the costs were high, and there was also the risk of the adhesive layers being incapable of following film shrinkage, which results in stripping. On the other hand, for laminated films without adhesive layers in between, while a certain degree of interlayer adhesion strength can be obtained by selecting specific resins, interlayer adhesion strength was still insufficient when used under conditions of actual use.

RELATED ART

Patent Documents

Patent Document 1: JP-A 2004-170715
Patent Document 2: JP-A 2005-131824
Patent Document 3: JP-A H10-244635
Patent Document 4: JP-A 2006-323340

SUMMARY OF THE INVENTION

The problem to be solved by the present invention is the provision of a thermally shrinkable laminated film in which an intermediate layer composed of a block copolymer resin composition comprising specific block copolymers and front and back layers composed of a polyester resin are directly laminated, and the interlayer adhesion strength between the layers is good.

The present invention is basically characterized by the following:

1. A thermally shrinkable laminated film formed by stretching along at least one axis a sheet comprising:
   an intermediate layer consisting of a block copolymer resin composition comprising a block copolymer (a) which consists of a vinyl aromatic hydrocarbon and a conjugated diene, and a block copolymer (b) which is different from the block copolymer (a) and consists of a vinyl aromatic hydrocarbon and a conjugated diene, the mass ratio of (a)/(b) being in a range of 20/80 to 50/50 and the content in percentages of the conjugated dienes being 20 to 30 mass %; and
   a front layer and a back layer which are laminated on two sides of the intermediate layer and consist of a polyester resin;
   the film having a thermal shrinkage rate of at least 40% in 10 seconds at 80° C. and an interlayer adhesion strength of at least 0.6 N/15 mm when separated at a tension rate of 500 mm/min in the direction of the stretching axis.

2. The thermally shrinkable laminated film according to 1 above, wherein the block copolymer resin composition comprises the block copolymer (a) and the block copolymer (b) at a mass ratio of (a)/(b) ranging from 25/75 to 45/55.

3. The thermally shrinkable laminated film according to 1 or 2 above, wherein:
   the block copolymer (a) consists of a linear block copolymer having a mass ratio of the vinyl aromatic hydrocarbon to the conjugated diene of 65/35 to 41/59, a number average molecular weight of 20,000 to 100,000, and:
   (1) a block portion consisting of the vinyl aromatic hydrocarbon on one end followed by a block portion which is a tapered block portion consisting of the conjugated diene and vinyl aromatic hydrocarbon, the conjugated diene gradually decreasing towards the other end;
   (2) the mass ratio of the vinyl aromatic hydrocarbon to the conjugated diene in the tapered block portion being 20/80 to 60/40; and
   (3) the proportion of the tapered block portion in the block copolymer being at least 60 mass %; and
   the block copolymer (b) consists of a linear block copolymer having a mass ratio of the vinyl aromatic hydrocarbon to the conjugated diene of 80/20 to 90/10, with at least one end being a block portion consisting of the vinyl aromatic hydrocarbon, and a number average molecular weight of at least 100,000 and at most 300,000.

4. The thermally shrinkable laminated film according to 3 above, wherein:
   the block copolymer (a) consists of a linear block copolymer having a mass ratio of the vinyl aromatic hydrocarbon to the conjugated diene of 60/40 to 45/55, a number average molecular weight of 50,000 to 80,000, a mass ratio of the vinyl aromatic hydrocarbon to the conjugated diene in the tapered block portion of 30/70 to 57/43, and a proportion of the tapered block portion in the block copolymer of at least 70 mass %; and
   the block copolymer (b) consists of a linear block copolymer having a mass ratio of the vinyl aromatic hydrocarbon to the conjugated diene of 82/18 to 88/12, and a number average molecular weight of at least 140,000 and at most 200,000.

5. The thermally shrinkable laminated film according to any one of 1 to 3 above, wherein the block copolymer resin composition further comprises 0.1 to 20 parts by mass of a styrene polymer when taking the sum of the block copolymer (A) and the block copolymer (B) as 100 parts by mass.

Since the thermally shrinkable laminated film according to the present invention uses a block copolymer resin composition comprising specific block copolymers (a) and (b) at a specific mass ratio in the intermediate layer and a polyester resin in the surface layers, it has a very high interlayer adhesion strength of at least 0.6 N/15 mm when separated at a tension rate of 500 mm/min in the direction of the stretching axis, and is useful in thermally shrinkable laminated labels and containers covered thereby.

MODES FOR CARRYING OUT THE INVENTION

The thermally shrinkable laminated film according to the present invention is formed by stretching along at least one axis a resin sheet comprising an intermediate layer and a front layer and a back layer laminated to the two sides of the intermediate layer. The intermediate layer comprises a block copolymer resin composition essentially comprising a block copolymer (a) which consists of a vinyl aromatic hydrocarbon and a conjugated diene and a block copolymer (b) which is different from the block copolymer (a) and consists of a vinyl aromatic hydrocarbon and a conjugated diene, and the front and back layers consist of a polyester resin.

Herebelow, the intermediate layer, the front and back layers and the thermally shrinkable laminated film itself shall be explained in the order mentioned.

[Intermediate Layer]

The intermediate layer consists of a block copolymer resin composition, and the block copolymer resin composition essentially comprises a block copolymer (a) and a block copolymer (b) which is different from the block copolymer (a), and in some cases, may further comprise copolymers such as other block copolymers.

<Block Copolymer (a)>

The block copolymer (a) consists of a vinyl aromatic hydrocarbon and a conjugated diene. Examples of the vinyl aromatic hydrocarbon include styrene, o-methyl styrene, p-methyl styrene, p-tert-butyl styrene, 2,4-dimethyl styrene, 2,5-dimethyl styrene, α-methyl styrene, vinyl naphthalene, and vinyl anthracene, among which styrene is particularly common. Examples of the conjugated diene include 1,3-butadiene, 2-methyl-1,3-butadiene (isoprene), 2,3-dimethyl-1,3-butadiene, 1,3-pentadiene and 1,3-hexadiene, among which 1,3-butadiene is particularly common.

The mass ratio of the vinyl aromatic hydrocarbon to the conjugated diene in the block copolymer (a) is 65/35 to 41/50 and is preferably 60/40 to 45/55. When the mass ratio of the vinyl aromatic hydrocarbon to the conjugated diene is less than 41/59, the outer appearance of the film deteriorates due to fisheye during the molding process. On the other hand, when the mass ratio of the vinyl aromatic hydrocarbon to the conjugated diene exceeds 65/35, sufficient interlayer adhesion strength cannot be obtained.

The number average molecular weight of the block copolymer (a) is preferably 20,000 to 100,000, and is particularly preferably 50,000 to 80,000. When the number average molecular weight of the block copolymer is less than 20,000, neck-in occurs easily during the molding process and a good film cannot be obtained. On the other hand, when the number average molecular weight of the block copolymer exceeds 100,000, fisheye occurs easily during the molding process and a good film cannot be obtained.

Additionally, the block copolymer (a) has a block portion consisting of the vinyl aromatic hydrocarbon on one end followed by a block portion which is a tapered block portion consisting of the conjugated diene and the vinyl aromatic hydrocarbon, the conjugated diene gradually decreasing towards the other end. The mass ratio of the vinyl aromatic hydrocarbon to the conjugated diene in the tapered block portion (i.e. vinyl aromatic hydrocarbon/conjugated diene) is 20/80 to 60/40, and is more preferably 30/70 to 57/43. When the mass ratio exceeds 60/40, the interlayer adhesion strength decreases. Moreover, when it is less than 20/80, fisheye occurs easily during molding processing.

Further, the proportion of the tapered block portion in the block copolymer (a) is at least 60 mass % and is preferably at least 70 mass %. When it is less than 60 mass %, the interlayer adhesion strength tends to decrease.

<Block Copolymer (b)>

The block copolymer (b) is also a block copolymer of a vinyl aromatic hydrocarbon and a conjugated diene, and similar to the case of the block copolymer (a), examples of the vinyl aromatic hydrocarbon used in its manufacture include styrene, o-methyl styrene, p-methyl styrene, p-tert-butyl styrene, 2,4-dimethyl styrene, 2,5-dimethyl styrene, α-methyl styrene, vinyl naphthalene, and vinyl anthracene, among which styrene is particularly common. Additionally, similar to the case of the block copolymer (a), examples of the conjugated diene include 1,3-butadiene, 2-methyl-1,3-butadiene (isoprene), 2,3-dimethyl-1,3-butadiene, 1,3-pentadiene, and 1,3-hexadiene, among which 1,3-butadiene is particularly common.

The mass ratio of the vinyl aromatic hydrocarbon to the conjugated diene in the block copolymer (b) (i.e. vinyl aromatic hydrocarbon/conjugated diene) is different from that in the block copolymer (a), and is 80/20 to 90/10, preferably 82/18 to 88/12. When the mass ratio is less than 80/20, resilience strength (rigidity) deteriorates. On the other hand, when the mass ratio exceeds 90/10, the tension elongation of the film decreases, and it breaks easily when processed as a label.

Moreover, the number average molecular weight of the block copolymer (b) is preferably 100,000 to 300,000, and is particularly preferably 140,000 to 200,000. When the number average molecular weight of the block copolymer (b) is less than 100,000, melt viscosity decreases, so molding processability decreases. On the other hand, when the number average molecular weight of the block copolymer (b) exceeds 300,000, melt viscosity is too high, so molding processability decreases and a good film cannot be obtained.

Additionally, as long as the block copolymer (b) has a block portion consisting of the vinyl aromatic hydrocarbon on one end, the structure of the portion following it is not particularly limited, though preferred examples include those having the following general formulas.

(i) A-B
(ii) A-B-A
(iii) A-C-A
(iv) A-C-B
(v) A-C-B-A
(vi) A-B-B
(vii) A-B-B-A

Here, in the above formulas, A represents a vinyl aromatic hydrocarbon polymer chain, B represents a vinyl aromatic hydrocarbon and conjugated diene copolymer chain, and C represents a conjugated diene polymer chain, each formula representing the order of arrangement of these polymer chains. For the block copolymer (b), a single structure of (i) to (vii) or a mixture of multiple structures may be used. Moreover, even if there are multiple A's, B's or C's in the general formulas, the molecular weight, the mass proportion of the conjugated diene, and the state of distribution of the vinyl aromatic hydrocarbon and conjugated diene of the polymer chains etc. are each independent and do not need to be the same. The molecular weight and composition distribution of the copolymer chain B are controlled mainly by the amounts of the vinyl aromatic hydrocarbon monomer and conjugated diene monomer added and the method of addition.

<Method of Producing Block Copolymers (a) and (b)>

The block copolymers (a) and (b) can be produced by using an organolithium compound as a polymerization initiator in an organic solvent and living anion polymerizing at least one vinyl aromatic hydrocarbon monomer and at least one conjugated diene monomer.

As the organic solvent, an aliphatic hydrocarbon such as butane, pentane, hexane, isopentane, heptane, octane or isooctane; an alicyclic hydrocarbon such as cyclopentane, methyl cyclopentane, cyclohexane, methyl cyclohexane or ethyl cyclohexane; or an aromatic hydrocarbon such as ethyl benzene or xylene may be used.

The organolithium compound is a compound with at least one lithium atom bound in the molecule, and for example, a monofunctional organolithium compound such as ethyllithium, n-propyllithium, isopropyllithium, n-butyllithium, sec-butyllithium or tert-butyllithium; or a polyfunctional organolithium compound such as hexamethylene dilithium, butadienyl dilithium or isoprenyl dilithium may be used.

As the vinyl aromatic hydrocarbon monomer and conjugated diene monomer used in the present invention, those mentioned above may be used, and one or more of each may be selected and used for the polymerization. Moreover, in the above-mentioned living anion polymerization using an organolithium compound as an initiator, almost all of the vinyl aromatic hydrocarbon monomers and conjugated diene monomers used in the polymerization reaction are converted to polymers.

For example, when obtaining a block copolymer having a vinyl aromatic hydrocarbon block portion followed by a tapered block portion, the vinyl aromatic hydrocarbon monomers may be introduced first, and after the reaction is completed, the vinyl aromatic hydrocarbon monomers and conjugated diene monomers can be introduced simultaneously. While the composition ratio of the tapered portion will change with the growth of the block portion due to the difference in reactivity ratio between the vinyl aromatic hydrocarbon and the conjugated diene at this time, it can be adjusted by the concentration of a randomizing agent.

A randomizing agent is a molecule with polarity, and while tetrahydrofuran (THF) is mainly used, other ethers, amines, thioethers, phosphoramides, alkylbenzene sulphonates, potassium or sodium alkoxides may also be used. Aside from THF, examples of appropriate ethers include dimethyl ether, diethyl ether, diphenyl ether, diethylene glycol dimethyl ether and diethylene glycol dibutyl ether. As the amines, tertiary amines, for example, other than trimethyl amine, triethyl amine and tetramethylethylene diamine, cyclic amines can also be used. In addition, triphenylphosphine, hexamethyl phosphoramide, potassium or sodium alkyl benzene sulphonate, and potassium or sodium butoxide can also be used as randomizing agents.

The amount of the randomizing agent added is preferably 0.001 to 10 parts by mass with respect to 100 parts by mass of all the monomers. The time of addition may be before the start of the polymerization reaction or it may be before the polymerization of copolymer chains. Additionally, more can be added if necessary.

The molecular weights of the block copolymers (a) and (b) used in the present invention can be controlled by the amount of the initiator added with respect to the total amount of monomers added.

Block copolymers (a) and (b) obtained in this manner are deactivated by adding a polymerization terminator such as water, alcohol, an organic acid, an inorganic acid or a phenolic compound in an amount sufficient to deactivate active ends. Additionally, since the stoichiometric number of deactivation at the polymerization active ends is proportional to the stoichiometric number of the added polymerization terminator, it is possible to take a production method in which only some polymerization active ends are deactivated during the polymerization, and raw material monomers are added subsequently to further continue the polymerization, and it is also possible to produce the block copolymers (a) and (b) simultaneously. There is no particular limitation to the number of deactivations during the reaction as long as not all of the polymerization active ends are deactivated. However, when polymerization is completed, all of the active ends need to be deactivated.

As the method of collecting copolymers from the resulting block copolymer solution, any method, such as a method of precipitation by a poor solvent such as methanol, a method of precipitation by evaporating the solvent by a heating roller or the like (drum dryer method), a method of concentrating the solution by a concentrator and then removing the solvent by a vent-type extruder, or a method of collecting the copolymers by dispersing the solvent in water and introducing water vapor to heat and remove the solvent (steam stripping method), may be used.

As described above, the block copolymer resin composition of the present invention essentially comprises the block copolymer (a) and the block copolymer (b) as the resin components, and in some cases, may further comprise copolymers such as other block copolymers. However, in the present invention, the mass ratio of the block copolymer (a) to the block copolymer (b) is (a)/(b)=20/80 to 50/50, and the content by percentage of the conjugated dienes in the overall block copolymers (a) and (b) must be 20 to 30 mass %. The more preferred mass ratio of component (a) and component (b) is (a)/(b)=25/75 to 45/55, and the content by percentage of the conjugated dienes is preferably 22 to 28 mass %. When component (a) is less than 20 mass %, the interlayer adhesion strength decreases, and when it exceeds 50 mass %, the resilience strength (rigidity) decreases. When the content by percentage of the conjugated dienes is less than 20 mass %, the interlayer adhesion strength decreases, and when it exceeds 30 mass %, the resilience strength (rigidity) decreases, fish-eye occurs easily during the molding process, and the outer appearance deteriorates.

Examples of block copolymers that may be included in the block copolymer resin composition of the present invention in addition to the block copolymers (a) and (b) include block copolymers consisting of vinyl aromatics and conjugated dienes that have a conjugated diene content of 20 to 30 mass % at a Vicat softening temperature of 65° C. to 90° C., and the mixed amount is preferably at most 40 mass % with respect to the block copolymer resin composition. Additionally, the Vicat softening temperature is measured at a load of 10 N in accordance with JIS K7206.

Further, the block copolymer resin composition of the present invention may comprise a styrene polymer. While examples of the styrene polymer include polystyrene, high impact polystyrene, styrene-(meth)acrylate ester and/or (meth)acrylate copolymers, polystyrene is particularly preferred. When mixing the styrene polymer, its mass ratio is at least 0.1 parts by mass and at most 20 parts by mass to a total of 100 parts by mass of the block copolymers (a) and (b), and is preferably at least 5 parts by mass and at most 15 parts by mass. When the mass ratio of the styrene polymer exceeds 20 parts by mass, interlayer adhesion and thermal shrinkability may decrease.

Furthermore, while a polyester resin which is the same or different from that used for the front and back layers may also be mixed in the block copolymer resin composition of the present invention, when it is mixed, it is preferably at most 10 mass % with respect to the resin composition constituting the intermediate layer. Moreover, a recycled material generated during the production of the laminated film of the present application may be mixed.

Additionally, while the block copolymer resin composition of the present invention may comprise polymers other than the polymers described up to now, the amount thereof must be within a range that does not interfere with the object of the present invention, and is usually at most 40 mass % and preferably at most 25 mass % with respect to the resin composition.

Further, various additives may be mixed in the above block copolymer composition in ranges that do not interfere with the object of the present invention as necessary. Examples of such additives include various stabilizers, processing aids, light stabilizers, softeners, plasticizers, anti-static agents, anti-clouding agents, mineral oils, fillers, colorants, dyes, fire-retardants and lubricants.

Examples of the above-mentioned stabilizers include phenolic antioxidants such as 2-tert-butyl-6-(3-tert-butyl-2-hydroxy-5-methylbenzyl)-4-methylphenylacrylate, 2-[1-(2-hydroxy-3,5-di-tert-pentylphenyl)ethyl]-4,6-di-tert-pentylphenylacrylate, and 2,6-di-tert-butyl-4-methylphenol; and phosphorus antioxidants such as trisnonylphenylphosphite and tris(2,4-di-tert-butylphenyl)phosphate. As the processing aids, light resistance improvers, softeners, plasticizers, anti-static agents, anti-clouding agents, mineral oils, fillers, colorants and fire-retardants etc., those generally known may be mentioned. Additionally, examples of lubricants include dimethylpolysiloxane, methylphenylpolysiloxane, fatty acids, glycerin fatty acid esters, diglycerin di fatty acid esters, fatty acid amides, fatty acid bisamides and hydrocarbon waxes.

The block copolymer composition is obtained by mixing the block copolymer (a), the block copolymer (b) and another polymer which is an optional component, and the mixing method, while not particularly limited, may be, for example, dry blending by a Henschel mixer, ribbon blender or V-blender etc., and may be followed by melting by an extruder and pelletizing. Alternatively, they may be added during stages such as, during the production of each polymer, before the start of the polymerization, during the polymerization reaction and treatment after the polymers are made. When adding an additive as necessary, the additive may be, for example, further added in a predetermined proportion to the above-mentioned block copolymer (a) and block copolymer (b) and mixed by a mixing method similar to the one mentioned above.

[Front and Back Layers]

The front and back layers in the present invention consist of a polyester resin. The polyester resin is a polycondensate mainly comprising a multivalent carboxylic acid component and a multivalent alcohol component, and examples of the multivalent carboxylic acid component include terephthalic acid, isophthalic acid, succinic acid and glutaric acid. One or more of these multivalent carboxylic acid components may be used. Additionally, examples of the multivalent alcohol component include ethylene glycol, 1,2-propylene glycol, 1,4-butanediol, neopentyl glycol, diethylene glycol, polyethylene glycol, tetramethylene glycol, and 1,4-cyclohexanedimethanol. One or more of these multivalent alcohol components may be used.

A polycondensate with terephthalic acid as a preferred multivalent carboxylic acid and ethylene glycol, diethylene glycol or 1,4-cyclohexanedimethanol as a preferred multivalent alcohol component may be used.

Examples of commercial products of the above-mentioned polyester resin include "PETG 6763" manufactured by Eastman Chemical Company and "SKYGREEN S2008" manufactured by SK Chemicals.

The polyester resin constituting the front and back layers may be one resin or a blend of two or more resins. For example, in cases where, as a label, heat resistance is needed, a polycondensate comprising neopentyl glycol in a diol component may be blended. Additionally, when considering resource recycling, used PET food containers or PET bottles may be processed into flakes and blended.

Additionally, when producing a films, various additives such as lubricants, stabilizers, anti-blocking agents and nucleating agents may be mixed in ranges that do not interfere with the object of the present invention with the polyester resin as necessary.

<Thermally Shrinkable Laminated Film>

The thermally shrinkable laminated film of the present invention is obtained by melting respectively the above-mentioned block copolymer resin composition and polyester resin as the intermediate (inner layer) and front and back layers by an extruder and using a feed-block or multi-manifold method to produce a laminated sheet with three layers in two types without adhesive layers and then uniaxially, biaxially or multiaxially stretching it. Examples of uniaxial stretching include methods in which an extruded sheet is stretched in a direction orthogonal to the direction of the extrusion by a tenter, methods in which an extruded tube-shaped film is stretched in a circumferential direction, and methods in which an extruded sheet is stretched in the direction of the extrusion by a roller. Examples of biaxial stretching include methods in which an extruded sheet is stretched in the direction of the extrusion by a roller then stretched in a direction orthogonal to the direction of the extrusion by a tenter or the like, and methods in which an extruded tube-shaped film is simultaneously or separately stretched in the direction of the extrusion and a circumferential direction.

Moreover, when producing a laminated sheet using a T-die sheet extruder, the temperature of the extruder is preferably 180 to 260° C. When it is less than 180° C., plasticization of the polyester resin is insufficient. When it exceeds 260° C., thermal degradation of the block copolymer resin composition promotes fisheye, and outer appearance deteriorates easily.

As to the ratio of the layers of the thermally shrinkable laminated film of the present invention, the thickness of the intermediate layer is at least 55% and at most 90% of the overall thickness, and is preferably at least 65% and at most 80%.

Additionally, when producing the thermally shrinkable laminated film of the present invention, the stretching temperature is preferably 80 to 120° C. When the stretching temperature is less than 80° C., the film may break during stretching. On the other hand, when the stretching temperature exceeds 120° C., a good shrinkage property of the film may not be obtained. The stretching temperature is particularly preferably within a range of Tg+5° C. to Tg+20° C. with respect to the glass transition temperature (Tg) of the compositions constituting the film. In cases where it is a multi-layered film, it is particularly preferably within a range of Tg+5° C. to Tg+20° C. where Tg is the lowest Tg of the polymer compositions of the layers. Additionally, the glass transition temperature (Tg) is obtained from the peak temperature of the loss elastic modulus of the compositions constituting the film. The draw ratio, while not particularly limited, is preferably 1.5 to 7 times and more preferably 4.5 to 5.5 times. When it is less than 1.5 times, thermal shrinkability is insufficient, and when it exceeds 7 times, stretching is difficult, and is therefore not preferred.

The overall thickness of the thermally shrinkable laminated film obtained by stretching is preferably 30 to 80 μm, and is more preferably 35 to 60 μm.

When using the thermally shrinkable laminated film as a thermally shrinkable label, the thermal shrinkage rate along the main stretching axis is preferably at least 40% in 10 seconds at 80° C. When the thermal shrinkage rate is less than 40%, a high temperature is needed when shrinking, so the productivity of containers covered thereby may decrease, and the products covered thereby may be adversely affected.

The interlayer adhesion strength of the laminated film only needs to be at least 0.6 N/15 mm along the main stretching axis. When it is less than 0.6 N, stripping occurs during label cutting, which is a stage before placing onto a container, and stripping from the center sealing portion occurs easily when placing onto the container due to thermal shrinkage, so it is not preferred. Moreover, by cutting a test piece into 100 mm in the direction of the main stretching axis (TD) and 15 mm in the orthogonal direction (MD), preliminarily stripping 50 mm of it in the TD direction, and clamping it between the chucks of a tensile tester so as to measure the T-type stripping strength in the TD direction, the interlayer adhesion strength may be obtained from the maximum load when stripping with an initial chuck space of 50 mm at a tension rate of 500 mm/min.

A thermally shrinkable laminated label of the present invention may be produced by a commonly known method, and may be produced by, for example, printing the stretched film and solvent sealing with the direction of the main stretching axis in the circumferential direction.

Containers in cases where thermally shrinkable laminated films of the present invention are used as thermally shrinkable labels are not particularly limited, but metal can containers such as those made of tin, TFS or aluminum (two-piece cans, three-piece cans and bottle cans with covers etc.), glass containers and polyethylene terephthalate (abbreviated as PET) containers are preferably used.

EXAMPLES

The present invention shall be explained with reference to the examples below. However, the present invention is not limited by these examples.

The block copolymers used in the examples and comparative examples were produced by the methods indicated in the reference examples below.

Reference Example 1

(1) 300 kg of cyclohexane containing 150 ppm of tetrahydrofuran and 22 kg of styrene monomers were introduced and kept at 30° C. in a reaction container.

(2) To this 2080 mL of a 10 mass % cyclohexane solution was added as a polymerization initiator solution to anion polymerize the styrene monomers.

(3) After the styrene monomers were completely consumed, a total amount of 33 kg of styrene monomers and a total amount of 45 kg of butadiene were added simultaneously while keeping the temperature inside the reaction system at 70° C., and the reaction was continued.

(4) After the reaction finished, 330 g of water was added to deactivate, and a solution containing polymers of Reference Example 1 was obtained.

(5) Per 100 parts by mass of the prepared monomers, 0.4 parts by mass of Sumilizer GS manufactured by Sumitomo Chemical Co., Ltd. and 0.3 parts by mass AO-50 manufacture by ADEKA Corporation were dissolved as stabilizers.

(6) Polymerization solutions were preliminarily concentrated, and were further devolatilized and extruded by a biaxial extruder with a depressurization vent to produce respective pellet-shaped block copolymers.

Reference Examples 2-18

Using the same equipment as Reference Example 1, block copolymers of Reference Examples 2018 were produced by the same procedure. Additionally, the amounts of the ingredients in stages (1) to (4) were summarized with those in Reference Example 1 and shown in Table 1 and Table 2.

In Reference Examples 5, 11 and 12, styrene monomers, 23 kg in Reference Example 5 and 55 kg in each of Reference Examples 11 and 12, were introduced between stages (3) and (4) while the temperature inside the reaction system was kept at 70° C., and polymerization was carried out. As such, the amounts of styrene monomers introduced in these reference examples were the total amounts of these amounts and the amounts in stages (1) and (3) indicated in Tables 1 and 2. In Reference Example 10, 12 kg of butadiene was introduced between stages (2) and (3) while the temperature inside the reaction system was kept at 70° C. (so together with the amount in stage (3), the total was 15 kg), and polymerization was carried out.

The number average molecular weights of the block copolymers synthesized in the above manner were measured by gel permeation chromatography (GPC) using the following apparatus and conditions.

Name of apparatus: "HLC-8220GPC" manufactured by Tosoh Corporation

Column used: Product name "Shodex GPCKF-404" manufactured by Showa Denko K.K.; series of four Column temperature: 40° C.

Detection method: ultraviolet spectroscopy

Mobile phase: tetrahydrofuran

Sample concentration: 2 mass %

Standard curve: standard polystyrenes (manufactured by Polymer Laboratories)

TABLE 1

| Order of Introduction | Raw Ingredients | Unit | Ref. Ex. 1 | Ref. Ex. 2 | Ref. Ex. 3 | Ref. Ex. 4 | Ref. Ex. 5 | Ref. Ex. 6 | Ref. Ex. 7 | Ref. Ex. 8 | Ref. Ex. 9 |
|---|---|---|---|---|---|---|---|---|---|---|---|
| (1) | Cyclohexane | kg | 300 | 300 | 300 | 300 | 300 | 300 | 300 | 300 | 300 |
|  | Styrene monomer | kg | 22 | 22 | 16 | 10 | 22 | 4 | 30 | 22 | 22 |
| (2) | n-butyl lithium solution | mL | 2080 | 2260 | 2260 | 2260 | 2260 | 2260 | 2260 | 7350 | 730 |
| (3) | Styrene monomer | kg | 33 | 23 | 48 | 30 | 19 | 60 | 40 | 33 | 33 |
|  | Butadiene | kg | 45 | 55 | 36 | 60 | 36 | 36 | 30 | 45 | 45 |
| (4) | Water for deactivation | g | 330 | 330 | 330 | 330 | 330 | 330 | 330 | 330 | 330 |
|  | Number average molecular weight of block copolymer ($\times 10^4$) |  | 8 | 7 | 7 | 7 | 7 | 7 | 7 | 2 | 20 |
|  | Bd proportion in block copolymer | mass % | 45 | 55 | 36 | 60 | 36 | 36 | 30 | 45 | 45 |

TABLE 2

| Order of Introduction | Raw Ingredients | Unit | Ref. Ex. 10 | Ref. Ex. 11 | Ref. Ex. 12 | Ref. Ex. 13 |
|---|---|---|---|---|---|---|
| (1) | Cyclohexane | kg | 300 | 300 | 300 | 300 |
|  | Styrene monomer | kg | 34 | 5 | 5 | 16 |
| (2) | n-butyl lithium solution | mL | 860 | 730 | 730 | 1130 |
| (3) | Styrene monomer | kg | 51 | 26 | 32 | 61 |
|  | Butadiene | kg | 3 | 14 | 8 | 23 |

TABLE 2-continued

| Order of Introduction | Raw Ingredients | Unit | Ref. Ex. 10 | Ref. Ex. 11 | Ref. Ex. 12 | Ref. Ex. 13 |
|---|---|---|---|---|---|---|
| (4) | Water for deactivation | g | 330 | 330 | 330 | 330 |
| | Number average molecular weight of block copolymer (×10⁴) | | 17 | 20 | 20 | 13 |
| | Bd proportion in block copolymer | mass % | 15 | 14 | 8 | 23 |

Example 1

(1) A mixture with 33 mass % of the block copolymer of Reference Example 1 and 67 mass % of the block copolymer of Reference Example 10 was prepared as an intermediate layer, and a polyester resin mixture with 98 mass % of SKYGREEN S2008 manufactured by SK Chemicals and 2 mass % of natural EPM-7Y029 manufactured by Sumika Color Co., Ltd. was prepared as front and back layers.
(2) A 40 m/m extruder for the front and back layers was set at 240° C. and a 65 m/m extruder for the intermediate layer was set at 200° C. in a T-die type multilayer sheet extruder (T-die lip width 300 mm) to obtain a laminated sheet with a layer ratio of 15/70/15 and a sheet thickness of 0.25 mm at a dicing temperature of 210° C.
(3) The resulting sheet was stretched 5 times in a transverse direction at 90° C. using a tenter type transverse stretching machine to obtain a 50 μm-thick thermally shrinkable laminated film.
(4) The thermal shrinkage rate of the resulting laminated film was evaluated using the following evaluation standards by immersing for 10 seconds in 80° C. hot water and calculating using the following equation.

Thermal shrinkage rate=$[(L1-L2)/L1] \times 100$ wherein L1: length before immersion (stretching direction), and
L2: length after shrinkage by immersing for 10 seconds in 80° C. hot water (stretching direction)
(5) The interlayer adhesion strength of the laminated film was measured using the following method.

A test piece was cut into 100 mm in the direction of the main stretching axis (TD) and 15 mm in the orthogonal direction (MD), 50 mm of it was preliminarily stripped in the TD direction, and clamped between the chucks of TENSILON universal material testing instrument RTG-1210 manufactured by A&D Company, Limited so as to measure T-type stripping strength in the TD direction, and the interlayer adhesion strength was obtained from the maximum load when stripping with an initial chuck space of 50 mm at a tension rate of 500 mm/min. The average value of seven tests was used as the measured value. Measurement conditions other than that were in accordance with JIS K6854-3.
(6) Tensile elasticity and tensile stretch were measured using TENSILON universal material testing instrument (RTC-1210A) manufactured by A&D Company, Limited in accordance with JIS K6871. A test piece was cut into 10 mm in the direction of the main stretching axis (TD) and 100 mm in the orthogonal direction (MD), and measured with an initial chuck space of 40 mm at a tensile rate of 200 mm/min. As long as the tensile elasticity is at least 900 MPa, there is no problem with practical use. As long as the tensile stretch is at least 300%, there is no problem with practical use.

Examples 2-9 and Comparative Examples 1-11

Sheets and films were made using the compositions of Tables 3 and 4 and methods similar to that of Example 1.
Additionally, for the "polystyrene" described in Tables 3 and 4, TOYO STYROL G-200C manufactured by Toyo Styrene Co., Ltd. was used. For the PET mixed in the intermediate layer, SKYGREEN S2008 manufactured by SK Chemicals was used. For the "block copolymer" described in Example 9 of Table 3, one with a Vicat softening temperature of 70° C., a styrene/butadiene ratio of 76/24 (mass %) and a number average molecular weight of 130,000 was used.
In Comparative Example 5, many fisheyes in the outer appearance of the film was observed, the film was judged as unsuitable for practical use, and the physical properties of the film were not evaluated.
In Comparative Example 9, neck-in during sheet formation was great, and the film could not be stretched.
In Comparative Example 10, sheet formation was unstable, and the film could not be stretched.

TABLE 3

| | | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Intermediate layer | Block copolymer (a) | | Ref. Ex. 1 | Ref. Ex. 2 | Ref. Ex. 3 | Ref. Ex. 1 | Ref. Ex. 2 | Ref. Ex. 2 | Ref. Ex. 1 | Ref. Ex. 1 | Ref. Ex. 1 |
| | Amount | mass % | 33 | 33 | 33 | 50 | 33 | 20 | 30 | 27 | 25 |
| | Block copolymer (b) | | Ref. Ex. 10 | Ref. Ex. 10 | Ref. Ex. 10 | Ref. Ex. 10 | Ref. Ex. 11 | Ref. Ex. 11 | Ref. Ex. 10 | Ref. Ex. 10 | Ref. Ex. 10 |
| | Amount | mass % | 67 | 67 | 67 | 50 | 67 | 80 | 60 | 54 | 50 |
| | Others | | — | — | — | — | — | — | polystyrene | polystyrene | Block copolymer |
| | Amount | mass % | — | — | — | — | — | — | 10 | 9 | 25 |
| | Conjugated diene content (%) | mass % | 25 | 28 | 22 | 30 | 28 | 22 | 23 | 20 | 25 |
| | PET amount (mass %) | | — | — | — | — | — | — | — | 10 | — |
| Layer ratio (front/intermediate/front) | | % | 15/70/15 | 15/70/15 | 15/70/15 | 15/70/15 | 15/70/15 | 15/70/15 | 15/70/15 | 15/70/15 | 15/70/15 |
| Film forming stability | | | good | good | good | good | good | good | good | good | good |
| Film appearance | | | good | good | good | good | good | good | good | good | good |

TABLE 3-continued

| | | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Physical properties of stretched film | 80° C. thermal shrinkage rate | % | 48 | 52 | 42 | 50 | 46 | 40 | 42 | 42 | 49 |
| | Interlayer adhesion strength | N/15 mm | 0.9 | 1.1 | 0.8 | 1.2 | 0.9 | 0.6 | 0.7 | 0.8 | 0.7 |
| | Tensile elasticity | MPa | 1040 | 980 | 1120 | 940 | 960 | 1100 | 1080 | 1100 | 1050 |
| | Tensile stretch | % | 360 | >400 | 340 | >400 | >400 | 310 | 360 | 370 | 370 |

TABLE 4

| | | Unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Intermediate layer | Block copolymer (a) | | Ref. Ex. 1 | Ref. Ex. 1 | Ref. Ex. 1 | Ref. Ex. 2 | Ref. Ex. 4 | Ref. Ex. 5 |
| | Amount | mass % | 10 | 60 | 25 | 50 | 33 | 33 |
| | Block copolymer (b) | | Ref. Ex. 10 | Ref. Ex. 10 | Ref. Ex. 10 | Ref. Ex. 10 | Ref. Ex. 11 | Ref. Ex. 11 |
| | Amount | mass % | 90 | 40 | 50 | 50 | 67 | 67 |
| | Others | | — | — | polystyrene | — | — | — |
| | Amount | mass % | — | — | 25 | — | — | — |
| | Conjugated diene content | mass % | 18 | 33 | 19 | 35 | 29 | 21 |
| | PET amount | mass % | — | — | — | — | — | — |
| | Layer ratio | % | 15/70/15 | 15/70/15 | 15/70/15 | 15/70/15 | 15/70/15 | 15/70/15 |
| | Film forming stability | | good | pass | good | pass | good | good |
| | Film appearance | | good | good | good | good | fail | good |
| Physical properties of stretched film | 80° C. thermal shrinkage rate | % | 35 | 53 | 34 | 54 | Not evaluable | 44 |
| | Interlayer adhesion strength | N/15 mm | 0.4 | 1.3 | 0.5 | 1.4 | | 0.4 |
| | Tensile elasticity | MPa | 1200 | 880 | 1150 | 830 | | 1120 |
| | Tensile stretch | % | 300 | >400 | 300 | >400 | | 320 |

| | | Unit | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|
| Intermediate layer | Block copolymer (a) | | Ref. Ex. 6 | Ref. Ex. 7 | Ref. Ex. 8 | Ref. Ex. 9 | Ref. Ex. 1 | Ref. Ex. 1 |
| | Amount | mass % | 33 | 40 | 33 | 33 | 25 | 25 |
| | Block copolymer (b) | | Ref. Ex. 11 | Ref. Ex. 11 | Ref. Ex. 11 | Ref. Ex. 11 | Ref. Ex. 12 | Ref. Ex. 13 |
| | Amount | mass % | 67 | 60 | 67 | 67 | 75 | 75 |
| | Others | | — | — | — | — | — | — |
| | Amount | mass % | — | — | — | — | — | — |
| | Conjugated diene content | mass % | 21 | 20 | 25 | 25 | 17 | 29 |
| | PET amount | mass % | — | — | — | — | — | — |
| | Layer ratio | % | 15/70/15 | 15/70/15 | 15/70/15 | 15/70/15 | 15/70/15 | 15/70/15 |
| | Film forming stability | | good | good | fail | fail | good | good |
| | Film appearance | | good | good | — | — | good | good |
| Physical properties of stretched film | 80° C. thermal shrinkage rate | % | 40 | 34 | Not evaluable | Not evaluable | 32 | 40 |
| | Interlayer adhesion strength | N/15 mm | 0.5 | 0.5 | | | 0.6 | 0.6 |
| | Tensile elasticity | MPa | 1100 | 1180 | | | 1200 | 890 |
| | Tensile stretch | % | 330 | 320 | | | 280 | >400 |

<Label Production>

A thermally shrinkable label was obtained by slitting the film obtained in Example 1, making it into a tubular shape such that the direction of the main stretching axis became the circumferential direction, and adhering the ends of the film by tetrahydrofuran.

<Film-Covered Container Production>

An aluminum bottle can with a cylindrical diameter of 66 mm was covered by the thermally shrinkable label of Example 1 and heated for 10 seconds at 90° C. to thermally shrink the label and to produce a film-covered container.

No interlayer stripping from the adhered part of the mounted label was observed, and shrink finishing properties were good.

INDUSTRIAL APPLICABILITY

The thermally shrinkable laminated film of the present invention is suitably used in thermally shrinkable labels, thermally shrinkable cap seals and packaging films for packing various containers.

The invention claimed is:

1. A thermally shrinkable laminated film formed by stretching along at least one stretching axis a sheet comprising:
   an intermediate layer comprising a block copolymer resin composition comprising a block copolymer (a) which consists of a vinyl aromatic hydrocarbon and a conjugated diene, and a block copolymer (b) which is different from the block copolymer (a) and consists of a vinyl aromatic hydrocarbon and a conjugated diene, such that a mass ratio of (a)/(b) is in a range of 20/80 to 50/50 and a content in percentages of the conjugated dienes in the total amount of block copolymers (a) and (b) is 20 to 30 mass %; and
   a front layer and a back layer which are laminated on two sides of the intermediate layer and comprise a polyester resin,
   wherein the laminated film has a thermal shrinkage rate of at least 40% in 10 seconds at 80° C. and an interlayer adhesion strength of at least 0.6 N/15 mm when separated at a tension rate of 500 mm/min in a direction of the at least one stretching axis, wherein:
   the block copolymer (a) consists of a linear block copolymer having a mass ratio of the vinyl aromatic hydrocarbon to the conjugated diene of 65/35 to 41/59, a number average molecular weight of 20,000 to 100,000, and:
   (1) a block portion consisting of the vinyl aromatic hydrocarbon on one end followed by a tapered block portion consisting of the conjugated diene and vinyl aromatic hydrocarbon wherein the conjugated diene gradually decreases towards the other end;
   (2) a mass ratio of the vinyl aromatic hydrocarbon to the conjugated diene in the tapered block portion is 20/80 to 60/40; and
   (3) a proportion of the tapered block portion in the block copolymer is at least 60 mass %; and
   the block copolymer (b) consists of a linear block copolymer having a mass ratio of the vinyl aromatic hydrocarbon to the conjugated diene of 80/20 to 90/10, with at least one end being a block portion consisting of the vinyl aromatic hydrocarbon, and a number average molecular weight of at least 100,000 and at most 300,000.

2. The thermally shrinkable laminated film of claim 1, wherein the block copolymer resin composition comprises the block copolymer (a) and the block copolymer (b) in a mass ratio of (a)/(b) ranging from 25/75 to 45/55.

3. The thermally shrinkable laminated film of claim 2, wherein:
   the block copolymer (a) consists of a linear block copolymer having a mass ratio of the vinyl aromatic hydrocarbon to the conjugated diene of 60/40 to 45/55, a number average molecular weight of 50,000 to 80,000, a mass ratio of the vinyl aromatic hydrocarbon to the conjugated diene in the tapered block portion of 30/70 to 57/43, and a proportion of the tapered block portion in the block copolymer of at least 70 mass %; and
   the block copolymer (b) consists of a linear block copolymer having a mass ratio of the vinyl aromatic hydrocarbon to the conjugated diene of 82/18 to 88/12, and a number average molecular weight of at least 140,000 and at most 200,000.

4. The thermally shrinkable laminated film of claim 2, wherein the block copolymer resin composition further comprises 0.1 to 20 parts by mass of a styrene polymer, such that a sum of the block copolymer (a) and the block copolymer (b) is 100 parts by mass.

5. The thermally shrinkable laminated film of claim 1, wherein:
   the block copolymer (a) consists of a linear block copolymer having a mass ratio of the vinyl aromatic hydrocarbon to the conjugated diene of 60/40 to 45/55, a number average molecular weight of 50,000 to 80,000, a mass ratio of the vinyl aromatic hydrocarbon to the conjugated diene in the tapered block portion of 30/70 to 57/43, and a proportion of the tapered block portion in the block copolymer of at least 70 mass %; and
   the block copolymer (b) consists of a linear block copolymer having a mass ratio of the vinyl aromatic hydrocarbon to the conjugated diene of 82/18 to 88/12, and a number average molecular weight of at least 140,000 and at most 200,000.

6. The thermally shrinkable laminated film of claim 5, wherein the block copolymer resin composition further comprises 0.1 to 20 parts by mass of a styrene polymer when taking the sum of the block copolymer (a) and the block copolymer (b) as 100 parts by mass.

7. The thermally shrinkable laminated film of claim 1, wherein the block copolymer resin composition further comprises 0.1 to 20 parts by mass of a styrene polymer, such that a sum of the block copolymer (a) and the block copolymer (b) is 100 parts by mass.

8. The thermally shrinkable laminated film of claim 1, wherein the vinyl aromatic hydrocarbon is styrene, and the conjugated diene is 1,3-butadiene.

9. A thermally shrinkable laminated film formed by stretching along at least one axis a sheet comprising:
   an intermediate layer consisting of a block copolymer resin composition comprising a block copolymer (a) which consists of a vinyl aromatic hydrocarbon and a conjugated diene, and a block copolymer (b) which is different from the block copolymer (a) and consists of a vinyl aromatic hydrocarbon and a conjugated diene, such that a mass ratio of (a)/(b) is in a range of 20/80 to 50/50 and a content in percentages of the conjugated dienes in the total amount of the block copolymers (a) and (b) is 20 to 30 mass %; and
   a front layer and a back layer which are laminated on two sides of the intermediate layer and comprising a polyester resin;
   the film having a thermal shrinkage rate of at least 40% in 10 seconds at 80° C. and an interlayer adhesion strength of at least 0.6 N/15 mm when separated at a tension rate of 500 mm/min in the direction of a stretching axis,
wherein:
the block copolymer (a) consists of a linear block copolymer having a mass ratio of the vinyl aromatic hydrocarbon to the conjugated diene of 65/35 to 41/59, a number average molecular weight of 20,000 to 100,000, and:
(1) a block portion consisting of the vinyl aromatic hydrocarbon on one end followed by a tapered block portion consisting of the conjugated diene and vinyl aromatic hydrocarbon wherein the conjugated diene gradually decreases towards the other end;
(2) a mass ratio of the vinyl aromatic hydrocarbon to the conjugated diene in the tapered block portion is 20/80 to 60/40; and
(3) a proportion of the tapered block portion in the block copolymer is at least 60 mass %; and
the block copolymer (b) consists of a linear block copolymer having a mass ratio of the vinyl aromatic hydrocarbon to the conjugated diene of 80/20 to 90/10, with at least one end being a block portion consisting of the vinyl aromatic hydrocarbon, and a number average molecular weight of at least 100,000 and at most 300,000.

10. A thermally shrinkable laminated film formed by stretching along at least one axis a sheet comprising of:
an intermediate layer comprising a block copolymer resin composition comprising a block copolymer (a) which consists of a vinyl aromatic hydrocarbon and a conjugated diene, and a block copolymer (b) which is different from the block copolymer (a) and consists of a vinyl aromatic hydrocarbon and a conjugated diene, such that a mass ratio of (a)/(b) is in a range of 20/80 to 50/50 and a content in percentages of the conjugated dienes in the total amount of block copolymers (a) and (b) is 20 to 30 mass %; and
a front layer and a back layer which are laminated on two sides of the intermediate layer and consist of a polyester resin;
the film having a thermal shrinkage rate of at least 40% in 10 seconds at 80° C. and an interlayer adhesion strength of at least 0.6 N/15 mm when separated at a tension rate of 500 mm/min in the direction of a stretching axis,
wherein:
the block copolymer (a) consists of a linear block copolymer having a mass ratio of the vinyl aromatic hydrocarbon to the conjugated diene of 65/35 to 41/59, a number average molecular weight of 20,000 to 100,000, and:
(1) a block portion consisting of the vinyl aromatic hydrocarbon on one end followed by a tapered block portion consisting of the conjugated diene and vinyl aromatic hydrocarbon wherein the conjugated diene gradually decreases towards the other end;
(2) a mass ratio of the vinyl aromatic hydrocarbon to the conjugated diene in the tapered block portion is 20/80 to 60/40; and
(3) a proportion of the tapered block portion in the block copolymer is at least 60 mass %; and
the block copolymer (b) consists of a linear block copolymer having a mass ratio of the vinyl aromatic hydrocarbon to the conjugated diene of 80/20 to 90/10, with at least one end being a block portion consisting of the vinyl aromatic hydrocarbon, and a number average molecular weight of at least 100,000 and at most 300,000.

* * * * *